(12) United States Patent
Gerhardt et al.

(10) Patent No.: US 7,841,190 B2
(45) Date of Patent: Nov. 30, 2010

(54) FREEZE-THAW VALVE THAT SELF-LIMITS CRYOGENIC AGENT USAGE

(75) Inventors: Geoff C. Gerhardt, Millbury, MA (US); Theodore Dourdeville, Marion, MA (US)

(73) Assignee: Waters Technologies Corporation, Milford, MA (US)

( * ) Notice: Subject to any disclaimer, the term of this patent is extended or adjusted under 35 U.S.C. 154(b) by 598 days.

(21) Appl. No.: 11/081,321

(22) Filed: Mar. 16, 2005

(65) Prior Publication Data

US 2006/0053807 A1 Mar. 16, 2006

Related U.S. Application Data

(63) Continuation of application No. PCT/US03/28910, filed on Sep. 15, 2003.

(60) Provisional application No. 60/410,997, filed on Sep. 16, 2002.

(51) Int. Cl.
*F17C 13/00* (2006.01)
*F17D 1/16* (2006.01)

(52) U.S. Cl. ............... 62/50.7; 62/601; 62/384; 137/251.1; 137/13; 137/828; 137/340

(58) Field of Classification Search ............ 137/13, 137/828, 341, 340, 251.1; 62/66, 130, 293
See application file for complete search history.

(56) References Cited

U.S. PATENT DOCUMENTS 3,433,299 A * 3/1969 Fleming ............... 165/135
3,576,112 A * 4/1971 Frost et al. ............ 62/605

(Continued)

FOREIGN PATENT DOCUMENTS

FR 2 422 884 4/1979

(Continued)

OTHER PUBLICATIONS

A Lab in Lilliput: A Dream or Reality?, CAST, Feb./Mar. 2001, Dr. Chris D. Bevan, pp. 10-14.

(Continued)

*Primary Examiner*—Cheryl J Tyler
*Assistant Examiner*—John F Pettitt
(74) *Attorney, Agent, or Firm*—Anthony J. Janiuk; Jamie H. Rose

(57) ABSTRACT

Methods and devices for the management of cryogenic agents within analytical systems using freeze thaw valving having an expansion chamber that limits the flow of the cryogenic agent. The expansion chamber is fitted with an expansion nozzle through which a cryogen flows and a porous frit that allows the cryogen to be exhausted. The porous frit initially allows a rapid flow of cryogen into the expansion chamber. This rapid flow lowers the temperature of the expansion chamber causing fluid contents within a freeze thaw segment to freeze. As the cryogen expands into the expansion chamber and turns into a solid, the porous frit is occluded causing the rapid flow to be restricted. The restriction of the cryogen flow by the occlusion of the porous frit allows the freeze thaw valve to use significantly less cryogen. Sublimation of the cryogen trapped within the porous frit provides sufficient cooling to maintain the valve in its closed position.

4 Claims, 12 Drawing Sheets

U.S. PATENT DOCUMENTS

| | | | |
|---|---|---|---|
| 3,663,203 A | 5/1972 | Davis et al. | |
| 3,738,424 A * | 6/1973 | Osmun et al. | 166/298 |
| 4,203,472 A | 5/1980 | Dulaney | |
| 4,220,012 A * | 9/1980 | Brister | 62/130 |
| 4,269,212 A | 5/1981 | Kaartinen | |
| 4,433,556 A * | 2/1984 | Brady | 62/293 |
| 4,612,959 A | 9/1986 | Costello et al. | |
| 4,766,922 A | 8/1988 | Kaartinen | |
| 4,944,161 A * | 7/1990 | Van Der Sanden | 62/293 |
| 4,949,742 A | 8/1990 | Rando et al. | |
| 5,014,738 A | 5/1991 | Jones | |
| 5,311,896 A | 5/1994 | Kaartinen | |
| 5,316,262 A | 5/1994 | Koebler | |
| 5,563,352 A | 10/1996 | Helmig | |
| 5,608,159 A * | 3/1997 | Carcone et al. | 73/49.8 |
| 5,795,788 A | 8/1998 | Bevan et al. | |
| 5,836,167 A * | 11/1998 | Clouston et al. | 62/66 |
| 5,988,197 A | 11/1999 | Colin | |
| 6,159,744 A * | 12/2000 | Bevan et al. | 436/180 |
| 6,173,761 B1 * | 1/2001 | Chandratilleke et al. | 165/104.21 |
| 6,311,713 B1 | 11/2001 | Kaartinen | |
| 6,342,184 B1 | 1/2002 | Bevan et al. | |
| 6,387,234 B1 | 5/2002 | Yeung et al. | |
| 6,557,575 B1 | 5/2003 | Gerhardt et al. | |

FOREIGN PATENT DOCUMENTS

| | | |
|---|---|---|
| WO | WO 86/06144 | 10/1986 |
| WO | WO 94/29690 | 12/1994 |

OTHER PUBLICATIONS

"Automation and Integration of Multiplexed On-Line Sample Preparation with Capillary Electrophoresis . . . "; Hongdong Tan, et al.; Anl. Chem. 1998, 70, 4044-4053.

Automated and Integrated System for High-Throughput DNA Genotyping Directly from Blood, Nanyan Zhang, et al.; Anal. Chem. 1999, 71, 1138-1145.

"Freeze-thaw flow management: a novel concept for high-performance liquid chromatography . . . "; Bevan, et al.; Journal of Chromatography A, 697 (1995) 541-548.

* cited by examiner

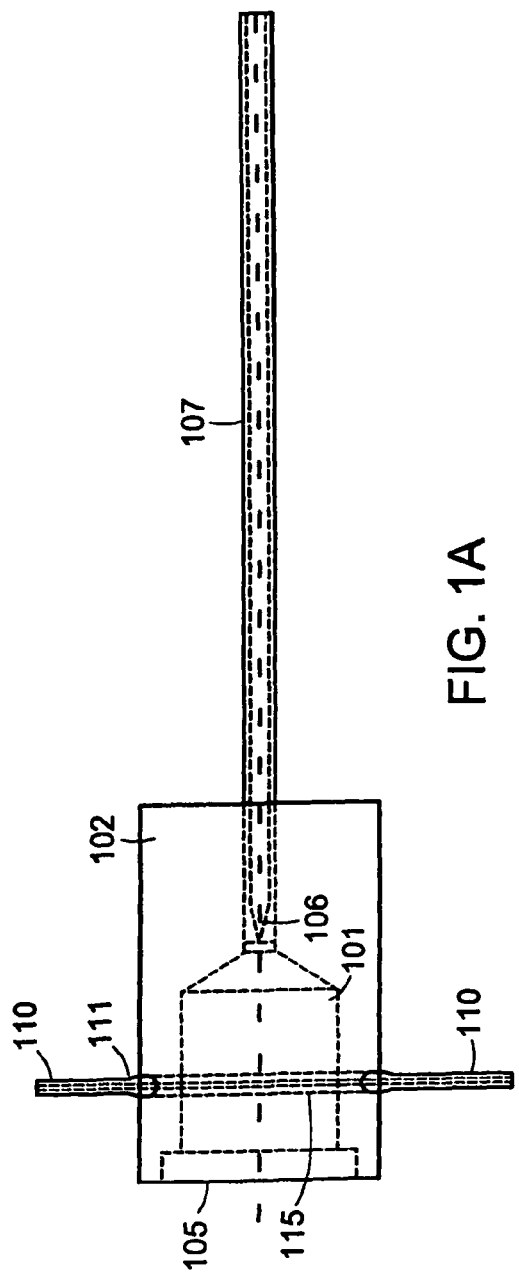
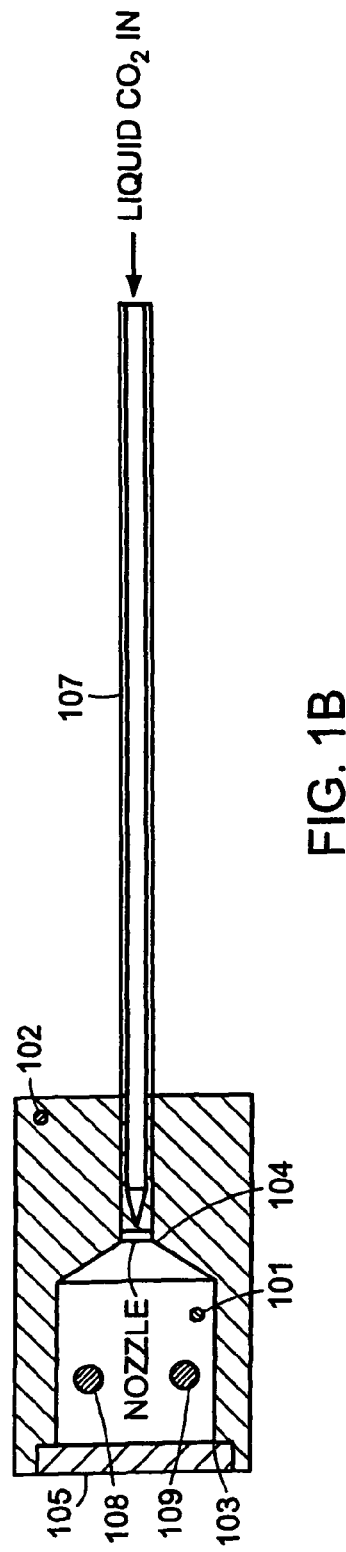
FIG. 1A
FIG. 1B

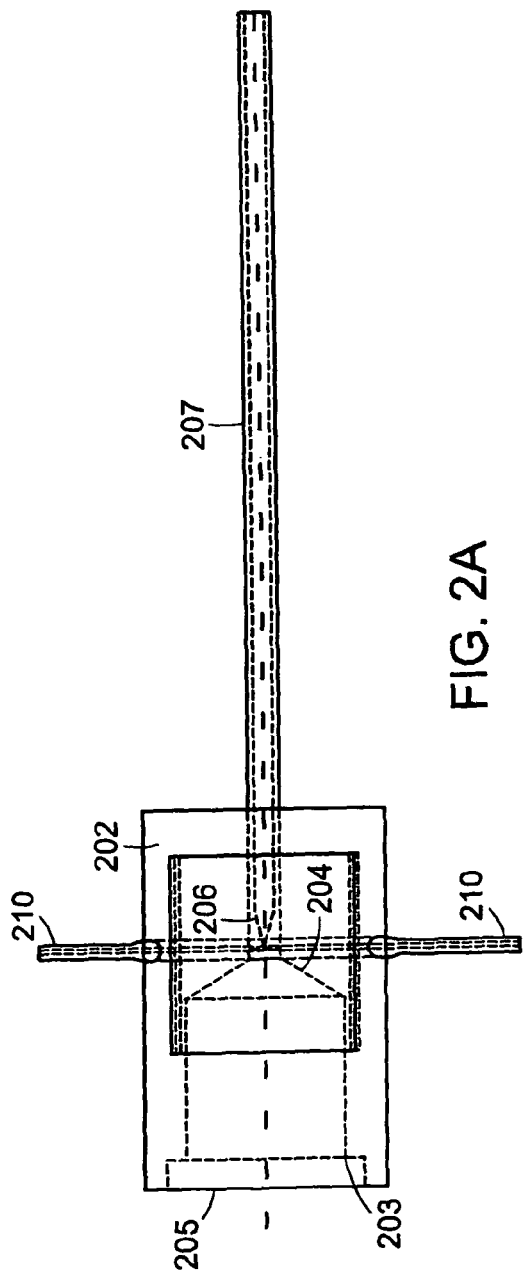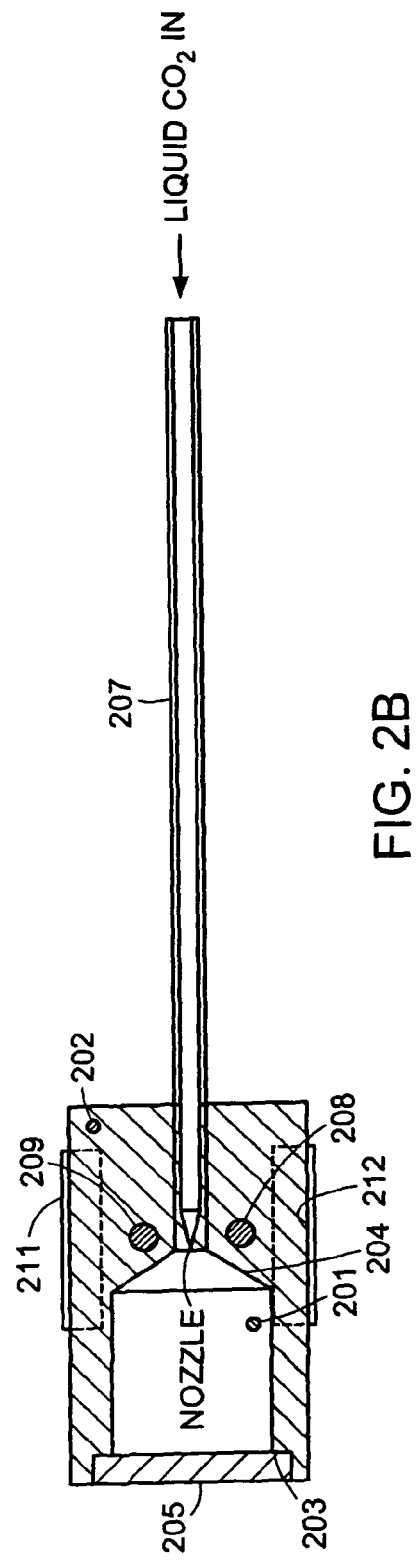

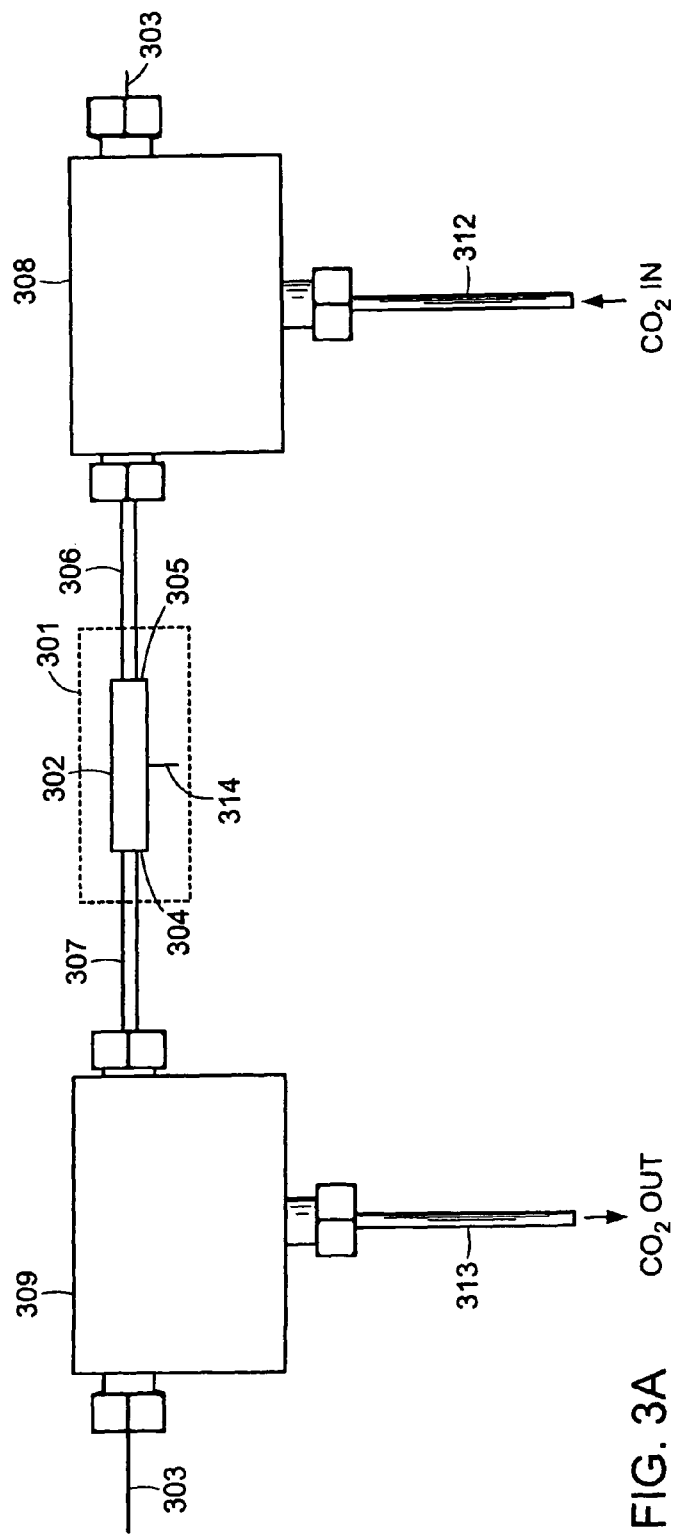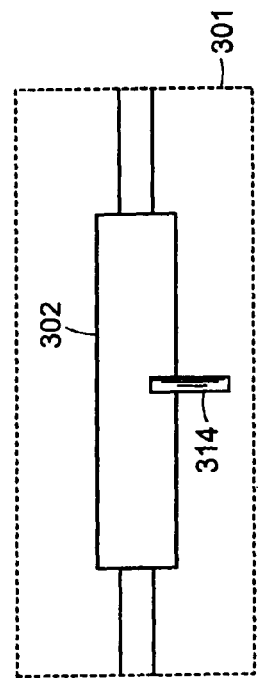
FIG. 3A
FIG. 3B

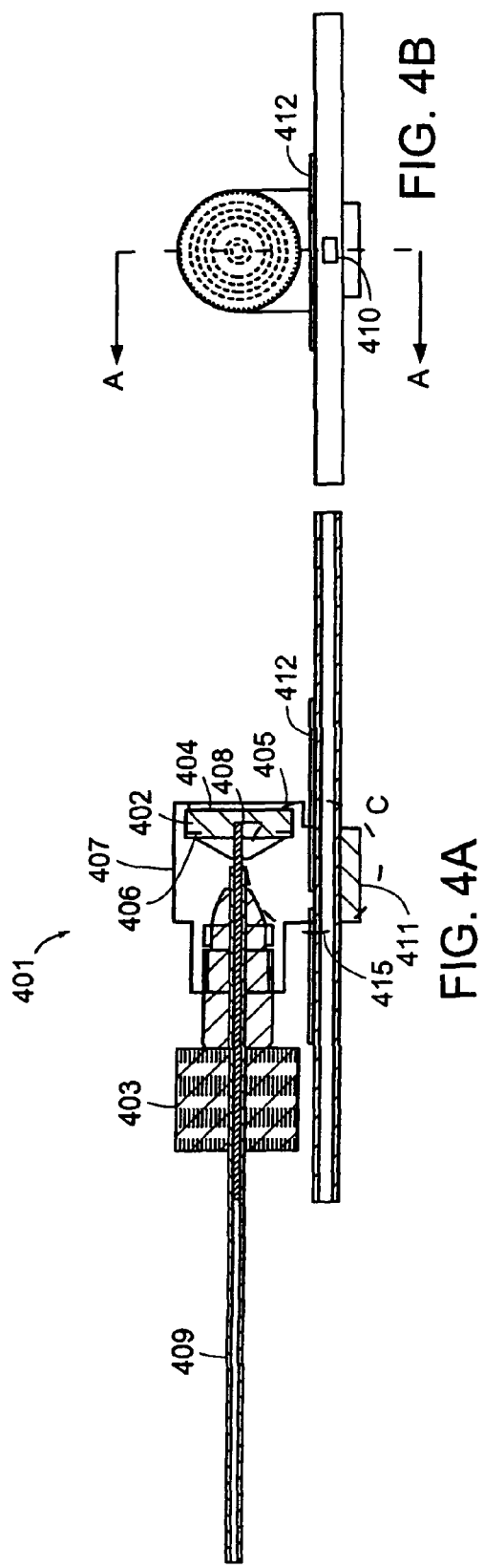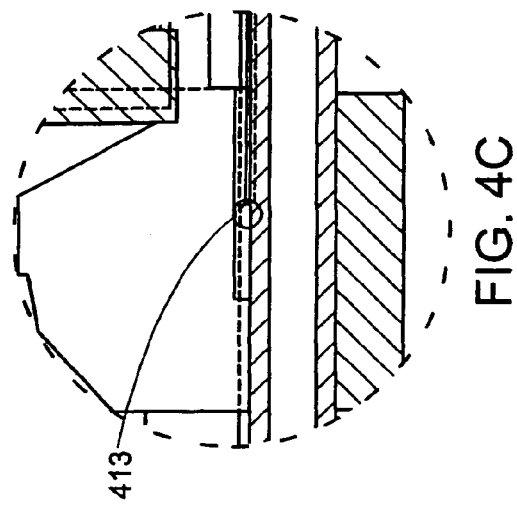

FREEZE-THAW VALVE THAT SELF-LIMITS CRYOGENIC AGENT USAGE

CROSS REFERENCE TO RELATED APPLICATIONS

This application claims benefit of and is a continuation of International Application No. PCT/U03/28910, filed Sep. 15, 2003 and designating the United States, which claims benefit of and priority to U.S. Provisional Application No. 60/410,977, filed Sep. 16, 2002. The entire contents of these applications are incorporated herein by reference.

FIELD OF THE INVENTION

This invention relates generally to a method and apparatus for controlling liquid flow through nano scale capillary tubing and channels, by freezing the liquid or thawing the frozen liquid in a segment of the tube or channel.

BACKGROUND OF THE INVENTION

The management of the flow of liquids within small diameter channels presents challenges as the scale of the channels and volumes of the liquids are reduced. One significant constraint is the configuration of traditional valve technology. The need to manage the flow of liquids in nano-liter volumes encounters significant limitation when the scale of fluid management is severely affected by dead space volume that is inherent within traditional switching methods. The method of using fluid within these nano scale capillaries and channels to act as an on/off valve by freezing and thawing that liquid is known in the art, see for example U.S. Pat. Nos. 6,159,744 and 5,795,788. It has been found that the flow of liquids can be stopped or diverted to a further channel or chamber by merely freezing and thawing the liquid contained within a segment of tubing or channel. This flow-switching device that is referred to as "freeze thaw valving," requires no moving parts and most importantly contributes no dead volume within the analytical system.

Prior art freeze thaw valves freeze the liquid within a freeze thaw segment by providing a jet of cold gas from a liquefied source of gas under pressure directly onto the freeze thaw segment. Pressurized gases such as liquid carbon dioxide and liquid nitrogen have been used to freeze the contents of the freeze thaw segment. Unfortunately, these cryogenic agents are aspirated directly at the freeze thaw segment without any method of recovery or limitation. The flow of these cryogenic agents without any limitation greatly increases the volume of their use and consequently the expense associated therewith. Further, the volume of cryogen necessary in prior art methods not only adds to the expense of their use within analytical systems, but also, because of the needed volumes the use of freeze thaw valving in small bench top or portable instruments is impractical.

Additionally, the prior art method of directing these agents at the freeze thaw segment, which is exposed to ambient air, causes the accumulation of frost buildup. This frost buildup forms an insulting layer that reduces exposure of the freeze thaw segment to the cryogen causing an increase in temperature within interior channels of the freeze thaw segment resulting ultimately in the failure of the freeze thaw valve. In addition, this frost accumulation on the freeze thaw valve during its closed operation is converted into liquid water upon heating/opening of the valve. If a freeze-thaw valve is used in an instrument, methods of draining this water away from sensitive electrical components in the instrument must be used.

SUMMARY OF THE INVENTION

The invention provides methods and devices for the management of cryogenic agents within analytical systems using freeze thaw valving.

According to the invention, a freeze thaw valve has an expansion chamber through which a pressurized liquid cryogen passes and consequently expands to its gaseous form. The valve body is fitted with an expansion nozzle through which the cryogen passes into the expansion chamber, and a porous sintered stainless steel frit through which the cryogen exits the expansion chamber. As the cryogen enters the lower-pressure expansion chamber, it expands from a liquid state to a gas. During this expansion the fluid draws heat from the valve body, cooling it, freezing the freeze thaw segment included in the valve body. The valve body is configured from materials with good thermal conductivity causing the temperature of the entire valve to be lowered. Fluidic conduits passing through thermal orifices within the expansion chamber or valve body will be "closed" due to their fluid contents being frozen. In addition to freezing the fluidic conduits passing through the valve body, the cooling effect caused by the cryogen expansion causes the cryogen to solidify under the low-pressure, low-temperature conditions existing in the expansion chamber. As the cryogen turns into a solid form the frit is occluded by the solid form of the cryogen causing the rapid flow to cease. The flow of cryogen is reduced to a nominal flow and the solid cryogen undergoes sublimation in the area of the frit. This sublimation of the solid cryogen provides continued cooling allowing the freeze thaw valve to remain closed. If the valve body is heated by its surrounding environment, solid cryogen may revert to its liquid form causing pin-holes or fissures in the solid cryogen plug allowing the cryogen to flow. As this liquid cryogen expands to a gas upon exiting the frit, it will provide the necessary cooling to re-seal fissures in the solid cryogen. In this closed, self-sealing state, cryogen consumed by the valve is due either to these re-sealing events or sublimation of the cryogen at the frit surface exposed to the atmosphere. The efficiency of the valve with respect to its cryogen consumption can be improved by thermally insulating the valve body from its surrounding environment. Insulating the valve body also prevents frost buildup on the valve body. To open the freeze thaw valve, the temperature of the valve body is raised by the heating of the valve body by electrical heating elements, or by flowing a warm gas over the exterior of the valve body.

In an alternative embodiment, an expansion chamber is configured to permit the rapid flow of a cryogen into the expansion chamber containing one or more freeze thaw segments. The device comprises a freeze thaw valve having an expansion chamber surrounding a freeze thaw segment to control the flow and use of a cryogenic agent. The configuration of the expansion chamber allows the cryogen to expand concentrically along the freeze thaw segment of a capillary. The inner diameter of the expansion chamber contains an appropriate restrictor geometry allowing the cryogen to initially flow rapidly through the expansion chamber producing a rapid temperature decrease within the freeze thaw segment. The rapid flow of the cryogen stops when a subsequent buildup of solid cryogen restricts flow through the expansion chamber. This restrictive geometry reduces the cryogen consumption significantly. Solid cryogen at the exit of the expansion chamber will sublimate to the atmosphere and the heat consumed by the sublimation process will maintain the valve body in a cooled state. If the expansion chamber is heated by its surrounding environment, solid cryogen may revert to its liquid form causing pin-holes or fissures in the solid cryogen plug allowing the cryogen to flow. As this liquid cryogen expands to a gas upon exiting the expansion chamber, it will provide the necessary cooling to re-seal fissures in the solid cryogen. In this closed, self-sealing state, cryogen consumed by the valve is due either to these re-sealing events or sublimation of the cryogen.

The efficiency of the valve with respect to its cryogen consumption can be improved by thermally insulating the valve body from its surrounding environment. Insulating the valve body will also prevent frost buildup on the valve body. To thaw the freeze thaw segment restrictive heating in the form of a wire coil around the capillary is used or the flow of a heated gas over the exterior of the expansion chamber achieves thawing of the capillary contents.

Advantages of the invention include provision of a freeze thaw valve that uses limited amounts of cryogen, advantageously conserving same. The freeze thaw valve according to the invention is more economical and can be used in bench top or portable systems. The freeze thaw valve configuration according to the invention limits frost build-up on the freeze thaw segment.

BRIEF DESCRIPTION OF DRAWINGS

These and other features and advantages of the present invention will become apparent from the following detailed description taken in conjunction with the accompanying drawings which illustrate the exemplary embodiments of the method and apparatus for freeze thaw valving of the present invention.

FIGS. 1A and 1B depict an illustrative self limiting cryogenic freeze thaw valve according to the invention;

FIGS. 2A and 2B depict an alternative illustrative self limiting cryogenic freeze thaw valve according to the invention.

FIG. 3A is a schematic of an alternative self limiting cryogenic freeze thaw valve according to the invention;

FIG. 3B is a cut away portion showing the expansion chamber of the self limiting cryogenic freeze thaw valve of FIG. 3A.

FIG. 4A is a schematic of an alternative self limiting cryogenic freeze thaw valve according to the invention;

FIG. 4B is a cut away of portion A showing the expansion chamber of the self limiting cryogenic freeze thaw valve of FIG. 4A;

FIG. 4C is a cut away of portion B showing the expansion chamber of the self limiting cryogenic freeze thaw valve of FIG. 4A;

DETAILED DESCRIPTION

Figure 5A:
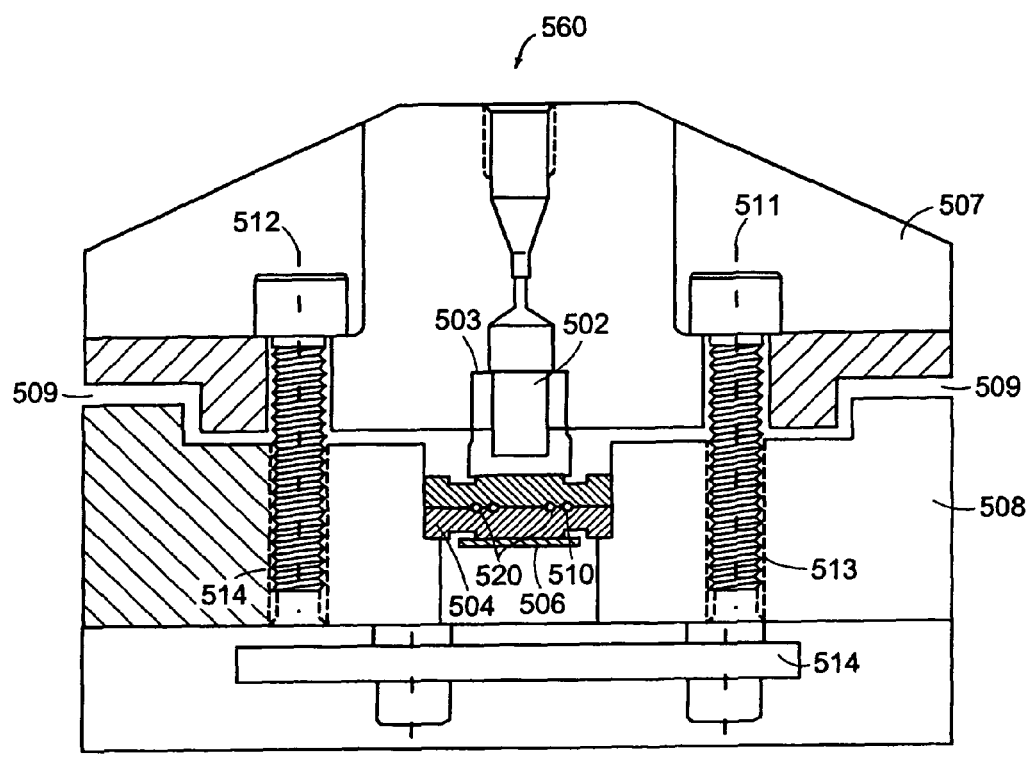
FIG. 5A is a schematic of an alternative self limiting cryogenic freeze thaw valve according to the invention.

In FIGS. 1A and 1B, an illustrative embodiment having an expansion chamber 101 within a metallic block 102 is shown. The metallic block 102 is fabricated in this illustrative embodiment from copper. The metallic block 102 may be fabricated from any of various metals that have good thermal conducting properties or other materials that are known to those skilled in the art to have sufficient strength and thermal conducting properties. The expansion chamber 101 has a distal end 103 and a proximal end 104. The distal end 103 contains a sintered stainless steel frit 105. The sintered stainless steel frit 105 allows the rapid passage of a cryogenic agent through the expansion chamber 101 effecting the sudden lowering of the temperature within the expansion chamber 101. The porosity of the sintered stainless steel frit 105 allows the cryogen to initially flow rapidly through the expansion chamber 101. The proximal end 104 of the expansion chamber 101 is fitted with an expansion nozzle 106 that restricts the flow of cryogen into the expansion chamber 101. The expansion nozzle 106 in this illustrative embodiment has an interior diameter of approximately 100 μm and is approximately 1 cm in length. The rate of cooling depends upon the size of the restrictor used in the expansion nozzle 106. The restrictor size controls the flow rate of the cryogen into the expansion chamber 101. The flow rate of the cryogen should be low enough that the differential pressure, $\Delta P$, across the frit 105 will be low and the pressure inside the expansion chamber 101 will be near ambient resulting in maximum expansion of the cryogen inside the expansion chamber 101. If the restrictor size is too large, the flow rate across the frit 105 will cause a significant $\Delta P$ across the frit 105 resulting in the majority of liquid to gas expansion occurring outside the expansion chamber 101 causing the cooling to occur outside the freeze thaw valve. Conversely, if the restrictor size is too small the resulting low mass flow rate of the cryogen through the expansion chamber 101 will be insufficient to effect a rapid temperature drop that is desired. The expansion nozzle 106 is connected to a supply tube 107 that is connected to a cryogenic agent supply that provides a cryogen such as liquid carbon dioxide at its vapor pressure (i.e. approximately 800 to 900 psi for liquid carbon dioxide).

The expansion chamber 101 contains a first thermal orifice 108 and a second thermal orifice 109. These thermal orifices 108, 109 pass through the expansion chamber 101 and allow for the insertion of freeze thaw segments 115 of fluid conduits 110. The freeze thaw segments 115 are surround by thermal sleeves 111 that are inserted into the respective thermal orifices 108, 109. The thermal sleeves 111 are configured from a material having good thermal conductivity. The thermal sleeves 111 are sealed within the metallic block 102 by methods known to those skilled in the art forming a substantially air tight seal. The thermal sleeves 111 contain heating elements that allow the thawing of fluid contents Within the freeze thaw segments 15.

In operation the cryogenic agent flows rapidly through the expansion nozzle 106 and into the expansion chamber 101 lowering the temperature of the metallic block 102 and subsequently the thermal sleeves 111 causing the fluid contents of the freeze thaw segments 115 to freeze. Initially the cryogen rapidly flows through the expansion chamber 101 and through the sintered stainless steel frit 105, however, as the liquid cryogen expands and turns to a solid it occludes the frit 105 causing the rapid cryogen flow to slow. Because of the occlusion of the frit 105, the only cryogen that exits the expansion chamber 101 will be that due to the sublimation. The expansion chamber 101 will equilibrate to a condition such that the sublimation of the cryogen trapped by the frit will maintain the freeze thaw valve at minus 50 to 60 degrees C. (i.e. when carbon dioxide is used as a cryogen). When the freeze thaw valve has been properly insulated and has equilibrated the entire expansion chamber 101 fills with solid cryogen. At this point of equilibrium a phase barrier exists (solid/liquid) in either the expansion chamber 101 or the supply tube 107 at a location where the temperature is sufficiently high to prevent the formation of solid cryogen. To open the freeze thaw valve, a valve within the supply tube 107 is turned off and the heating elements within the thermal sleeves 111 surrounding the freeze thaw segment 115 are turn on, causing the contents of the freeze thaw segments 115 to thaw. The contents of the capillary or flow channel thaw, allowing flow within these fluid conduits to resume, effectively causing the freeze thaw valve to be in the "on" position. The valve body 102 can also be fitted with a thermocouple that can indicate the valve state to an external controlling system or signal a supply valve within the supply tube 107 to open or close as an alternate or additional means of limiting cryogen usage.

Turning to FIGS. 2A and 2B, a further alternative embodiment is shown. This illustrative embodiment has an expansion chamber 201 within a metallic block 202. The metallic block 202 in the illustrative embodiment is made from copper. The metallic block 202 may be fabricated from any metal that has good thermo conducting properties or other materials that are known to those skilled in the art that have sufficient strength and thermo-conducing properties. The expansion chamber 201 has a distal end 203 and a proximal end 204. The distal end 203 contains a sintered stainless steel frit 205. The sintered steel frit 205 has a porosity that allows a cryogenic agent to initially flow rapidly through the expansion chamber 201, thereby lowering its temperature and causing the fluid contents within the freeze thaw segment to freeze. As the liquid cryogenic agent expands and turns to its solid form it occludes the sintered steel frit 205 causing the cryogenic flow to cease. Sublimation of the solid cryogen from the frit 205 causes the lowered temperature to be maintained. In this illustrative embodiment liquid carbon dioxide is used, however, other cryogenic agents such as liquid nitrogen may be used.

The proximal end 204 of the expansion chamber 201 is fitted with an expansion nozzle 206 that restricts the flow of cryogen into the expansion chamber 201. The expansion nozzle 206 typically has an interior diameter of approximately 100 µm and is approximately 2 cm in length. The rate of cooling depends upon the size of the restrictor used in the expansion nozzle 206. The restrictor size controls the flow rate of the cryogen into the expansion chamber 201. The flow rate of the cryogen should be low enough that the $\Delta P$ across the frit 205 will be low and the pressure inside the expansion chamber 201 will be near ambient resulting in maximum expansion of the cryogen inside the expansion chamber 201. Again, if the restrictor size is too large, the flow rate across the frit 205 will cause a significant $\Delta P$ across the frit 205 resulting in the majority of liquid to gas expansion occurring outside the expansion chamber 201 causing the cooling to occur outside the freeze thaw valve. Conversely, if the restrictor size is too small the resulting low mass flow rate of the cryogen through the expansion chamber 201 will be insufficient to effect a rapid temperature drop that is desired.

The expansion nozzle 206 is connected to a supply tube 207 that is connected to a cryogenic agent supply that provides a cryogen such as liquid carbon dioxide at its vapor pressure (i.e. approximately 800 to 900 psi for liquid carbon dioxide). The metallic block 202 contains a first thermal orifice 208 and a second thermal orifice 209 that are configured to receive fluidic conduits 210. The first thermal orifice 208 and the second thermal orifice 209 are located within the proximal end 204 of the metallic block 202. These thermal orifices 208, 209, are positioned near the expansion chamber. The position of the thermal orifices 208, 209 is such that a drop in the temperature in the expansion chamber 201 causes a corresponding lowering of temperature in the metallic block 202 and the thermal orifices 208, 209. The lowered temperature of the thermal orifices 208, 209 freezes the fluid contents of the freeze thaw segment 215. The resulting frozen contents of the freeze thaw segment 215 cause the freeze thaw valve to be effectively in the off position.

It is contemplated within the scope of the invention that the metallic block 202 can have a singular thermal orifice or multiple thermal orifices depending on the configuration of the analytical apparatus. It is further contemplated that orifices within the metallic block 202 can receive fluid conduits, heating elements or other devices such as a thermocouple. The metallic block 202 further contains a first heating element 211 and a second heating element 212. The heating elements 211, 212 are positioned within the metallic block 202 adjacent to the orifices 208, 209. When the heating elements 211, 212 are switched on and a valve within the supply tube 207 is turned off the temperature of the metallic block is raised and the contents of the freeze thaw segment 215 are thawed causing the freeze thaw valve to be in the on position. The valve body 202 can also be fitted with a thermocouple that can indicate the valve state to an external controlling system or signal a supply valve within the supply tube 207 to open or close as an alternate or additional means of limiting cryogen usage.

Turning to FIGS. 3A and 3B, an additional alternative embodiment freeze thaw valve 301 having an expansion chamber 302 to limit use of a cryogenic agent, is shown. The expansion chamber 302 has an inner diameter of approximately 0.062 inches and an outer diameter of approximately 0.125 inches. The inner diameter of the expansion chamber 302 allows a capillary tubing 303 having an outer diameter of approximately 365 µm to be inserted through the expansion chamber 302. The expansion chamber has a distal end 304 and a proximal end 305. Attached to the proximal end 305 of the expansion chamber 302 is an expansion chamber restriction tube 306 having an interior diameter of approximately 0.015 inches and an outer diameter of approximately 0.062 inches. Affixed to the distal end 304 of the expansion chamber 302 is an expansion chamber exit tube 307. The expansion chamber restriction tube 307 has an interior diameter of approximately 0.04 inches and an outer diameter of approximately 0.062 inches. The expansion chamber restriction tube 306 is fitted to an entrance-mixing tee 308. The entrance-mixing tee 308 allows the capillary tubing 303 to pass through the expansion chamber 302. The entrance mixing tee 308 also allows the expansion chamber 302 to be connected to a cryogenic agent source by means of a supply tube 312.

In operation, the cryogen flows through the supply tube 312 through the entrance mixing tee 308 into the expansion chamber 302 surrounding the capillary tubing 303. The expansion of the cryogen into the expansion chamber 302 causes a sudden drop of temperature within the valve body. This sudden drop in temperature causes the freezing of the interior contents of a section of the capillary tubing 303 known as a freeze valve segment. The geometry of the expansion chamber 302 is such that the cryogen is expanded concentrically along the freeze thaw segment. This geometry within the interior of the expansion chamber 302 allows the cryogen to initially flow rapidly through the expansion chamber 302 producing a sudden temperature drop and the subsequent freezing of fluid within the freeze thaw segment causing the freeze thaw valve 301 to be in the off position.

As in the previously described embodiment, the rapid flow of the cryogen stops as solid cryogen begins to build up at the exit of the expansion chamber 302 and in the exit tube 307 to restrict flow through the expansion chamber 302. This buildup of solid cryogen reduces the rapid flow of the cryogen to a nominal flow. The temperature within the expansion chamber 302, when using carbon dioxide as a cryogen, is approximately minus 50 to 60 degrees Celsius (i.e. when carbon dioxide is used as a cryogen) and this temperature is maintained by the nominal flow of cryogen. The expansion chamber restriction tube 307 is fitted to an exit-mixing tee 309. The exit-mixing tee 309 allows the capillary tubing 303 to pass through and it also allows the expansion chamber 302 to vent or recover the cryogenic agent via an exit tube 313. The expansion chamber 302 can also be fitted with a thermocouple 314 that can indicate the valve state to an external controlling system or signal a supply valve within the supply tube 312 to open or close as an alternate or additional means of limiting cryogen usage.

A heating element wrapped around the expansion chamber is used to thaw the freeze thaw segment of the capillary tubing to turn the freeze thaw valve 301 to the on position. Alternatively, a supply mixing tee within the supply tubing 312 can supply the flow of a warm gas into the expansion chamber 302 to thaw the freeze thaw segment thereby turning the freeze thaw valve 301 to the on position.

Turning to FIGS. 4A, 4B and 4C, a further additional alternative embodiment freeze thaw valve 401 having an expansion chamber 402 within a valve body to limit use of a cryogenic agent, is shown. This further additional embodiment illustrates the above described self limiting freeze thaw valve use as a rapid temperature cycling device in a microfluidic application. Operation of this alternative embodiment is similar to the above previously described embodiments. A liquid cryogen is sprayed into an expansion chamber 402, cooling it to a temperature at which solid cryogen will form and block a sintered stainless steel frit 404, reducing flow of cryogen through the expansion chamber 402. The expansion chamber 402 is located within a metallic block 407. The metallic block 407 in the illustrative embodiment is made from copper. The metallic block 407 may be fabricated from any metal that has good thermo conducting properties or other materials that are known to those skilled in the art that have sufficient strength and thermo-conducting properties. The expansion chamber 403 has a distal end 405 and a proximal end 406. The distal end 405 contains the sintered stainless steel frit 404. The sintered steel frit 404 has a porosity that allows a cryogenic agent to initially flow rapidly through the expansion chamber 402, thereby lowering its temperature and causing the fluid contents within the freeze thaw segment to freeze. As the liquid cryogenic agent expands and turns to its solid form it occludes the sintered steel frit 404 causing the cryogenic flow to cease. Sublimation of the solid cryogen from the frit 404 causes the lowered temperature to be maintained. In this illustrative embodiment liquid carbon dioxide is used, however, other cryogenic agents such as liquid nitrogen may be used.

The proximal end 406 of the expansion chamber 403 is fitted with an expansion nozzle 408 that restricts the flow of cryogen into the expansion chamber 403. The expansion nozzle 408 typically has an interior diameter of approximately 100 μm and is approximately 2 cm in length. The rate of cooling depends upon the size of the restrictor used in the expansion nozzle 408. The restrictor size controls the flow rate of the cryogen into the expansion chamber 402. The flow rate of the cryogen should be low enough that the ΔP across the frit 404 will be low and the pressure inside the expansion chamber 402 will be near ambient resulting in maximum expansion of the cryogen inside the expansion chamber 402. If the restrictor size is too large, the flow rate across the frit 404 will cause a significant ΔP across the frit 404 resulting in the majority of liquid to gas expansion occurring outside the expansion chamber 402 causing the cooling to occur outside the freeze thaw valve. Conversely, if the restrictor size is too small the resulting low mass flow rate of the cryogen through the expansion chamber 402 will be insufficient to effect a rapid temperature drop that is desired.

The expansion nozzle 408 is connected to a supply tube 409 using a compression screw 403. The supply tube 409 is connected to a cryogenic agent supply that provides a cryogen such as liquid carbon dioxide at its vapor pressure (i.e. approximately 800 to 900 psi for liquid carbon dioxide).

A microfluidic channel 410 is located between a cold face 415 of the valve body and a heating element 411. Temperature cycling of this illustrative embodiment can be used to block passage of fluids within the microfluidic channel 410 (i.e. as a valve), storage of temperature labile samples within a channel, or cell lysis (i.e. in a lab-on-a-chip device, whole cells could be injected into the chip, lysed using thermal cycling to release intercellular material prior to on-chip analysis). In addition to the heating element 411 used to warm the valve body from its cold state, a thin-film area heating element 412, as shown in FIG. 4B, surrounds the rapid temperature cycling device. The thin film area heater 412 can be employed to reduce thermal communication of the cycling temperature to the rest of the microfluidic device. A thermocouple 413 can also be used to monitor the temperature within the rapid temperature cycling device and to control the supply of cryogen or the operation of the heating element 411. It is contemplated within the scope of the invention that the metallic block 407 can be configured to form specific geometric shapes or protrusions to accommodate the application of a thermal state within a microfluidic device.

Figure 5B:
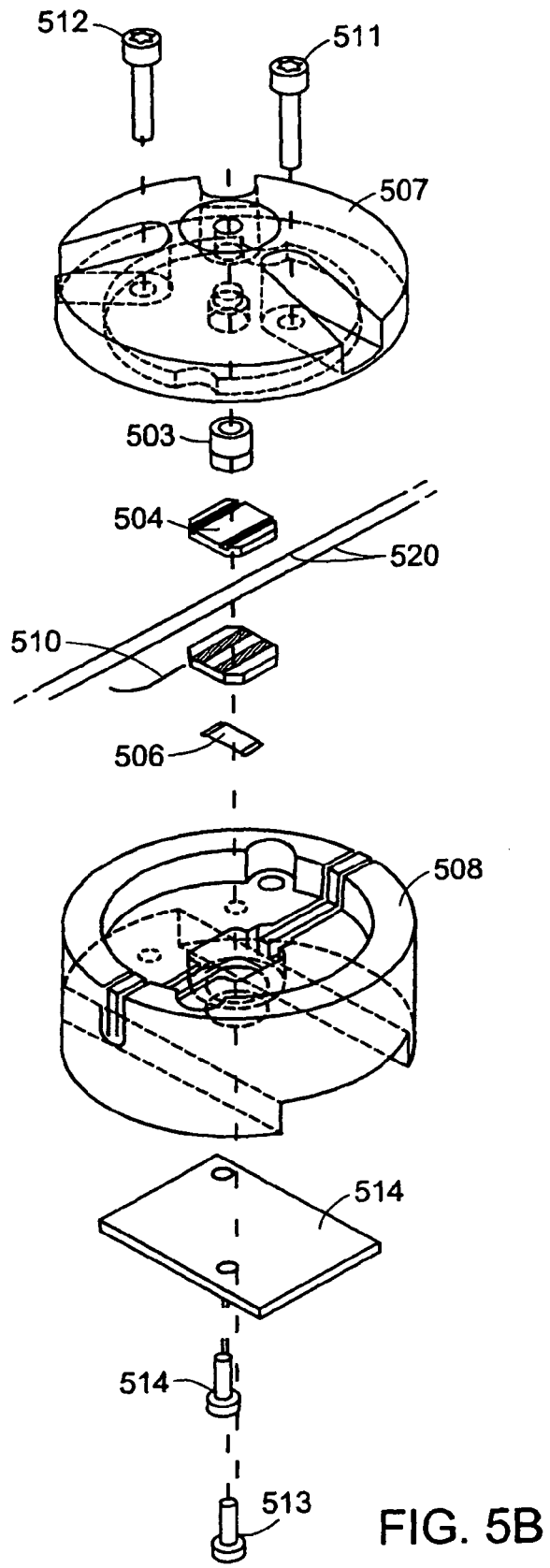
FIG. 5B is a schematic of the assembly of an alternative self limiting cryogenic freeze thaw valve according to the invention.

Turning to FIGS. 5A and 5B, yet a further additional alternative embodiment freeze thaw valve 500 having an expansion chamber 502 to limit use of a cryogenic agent, is shown. Whereas all previous embodiments vent the cryogen axially (i.e. cryogen enters the valve body from one end and exits from the other), this illustrative embodiment shows an embodiment which uses radial venting of the cryogen.

As in previous embodiments, the liquid cryogen is aspirated into an expansion chamber 502 having a fritted element 503. The fritted element 503 within this illustrative embodiment is in the form of a cup, however, it is contemplated within the scope of this invention that other geometric shapes may be used. The rapid expansion of the liquid cryogen cools the fritted element 503 rapidly resulting in the formation of solid cryogen which occludes the fritted element 503 and reduces cryogen flow through the device. In this illustrative embodiment, a copper thermal sink 504 is bonded to the base of the fritted element 503 creating thermal communication between them.

The temperature drop resulting from cryogen expansion and subsequent sublimation is rapidly communicated to the copper thermal sink 504 through which fluidic conduits 520 to be valved are passed. Rapid warming of the copper thermal sink 504 is achieved using a heating element 506 bonded to the opposite side of the copper thermal sink 504. The size of the thermal sink 506 can be reduced significantly to achieve more rapid thermal cycling. Unlike the above illustrative embodiments, the valve body is comprised of an upper valve body 507 and a lower valve body 508 having a gap between them. These gaps form a vent 509 that allows for the cryogen to be vented in a radial manner to the atmosphere. The radial venting of the cryogen through gaps between the upper 507 and lower 508 valve body maintains a cryogen atmosphere around the low-temperature components of the valve eliminating the accumulation of frost on these components.

A thermocouple 510 can be used to monitor the temperature within this illustrative freeze thaw valve and to control the supply of cryogen or the operation of the heating element 506. Additionally, control electronics 514 can be used to monitor and adjust the inventive freeze thaw valve based upon signals from the thermocouple 510.

The alternative illustrated embodiment contains a first threaded fastener 511, a second threaded fastener 512, a first threaded receiving void 513 and a second threaded receiving void 514. The first and second threaded receiving voids 513, 514 are located within the lower valve body 508 and receive the threaded fasteners 511, 512. The threaded fasteners 511, 512 and the threaded receiving voids 513, 514 allow the upper valve body 507 and lower valve body 508 to be fastened together. This allows for a "clamp-on" type freeze thaw valve rather than one in which capillaries are threaded through. The "clamp-on" configuration allows for the inventive freeze thaw valve to be applied to capillaries already installed in a fluidic system.

Turning to FIGS. 6A, 6B, 6C and 6D, a further additional alternative embodiment freeze thaw valve 600 fabricated from a micro-porous material to limit use of a cryogenic agent, is shown. Whereas all previous embodiments vent the cryogen axially (i.e. cryogen enters the valve body from one end and exits from the other) or radially through a fitted element or restrictive nozzle, this illustrative embodiment uses a freeze thaw valve housing 602 fabricated from a porous material allowing for the venting of the cryogen.

In previous illustrative embodiments, the liquid cryogen is aspirated into an expansion chamber having a fritted element. The rapid expansion of the liquid cryogen cools the fritted element rapidly resulting in the formation of solid cryogen that occludes the fritted element and reduces cryogen flow through the device. In this alternative illustrative embodiment, the freeze thaw valve housing 602 is fabricated from a micro-porous material that provides micro vents within the valve housing 602.

The micro-porous material, in this illustrative embodiment, is a gas permeable aluminum composite having a porosity of approximately 1.143 liters/ min/cm$^2$ in a plate thickness of approximately 20 millimeters with a pressure differential of approximately 1.0 bar. The density of the composite is approximately 1.8 grams/cm$^3$. The aluminum composite has an impact strength of approximately 11.8 KJ/m$^2$, a tensile strength of approximately 28 MPa and a compressive strength of approximately 95 MPa with an apparent yield point of 19.8 MPa. The elastic modulus of the aluminum composite is approximately 6450 Mpa and it has a Brinell hardness at HB 5/306.5 of approximately 69. Thermal conductivity of the aluminum composite at 100° C. is approximately 19.1 Wm$^{-1}$ °K$^{-1}$ and with direct flow >200 Wm$^{-1}$ °K$^{-6}$ and its coefficient of thermal expansion between 25-110 ° C. is approximately 30.4 °K$^{-1}$×10$^{-6}$.

In particular, the aluminum composite used in this illustrative embodiment is manufactured by algroup alusuisse, Alusuisse, Netherland under the trade name METAPOR ®. It is contemplate within the scope of this invention that other porous materials known in the art may be used, such as porous ceramic or the like. This aluminum composite material provides micro pores that act as micro vents. These micro vents are gas permeable allowing for evacuation of the cryogen from the freeze thaw housing 602. In this alternative illustrative embodiment, a liquid cryogen is introduced into the freeze thaw housing 602 via a cryogen inlet tube 603. The expansion of the liquid cryogen rapidly cools the freeze thaw housing 602 resulting in the formation of solid cryogen that occludes the micro-porous vents within the freeze thaw housing 602. The occlusion of the micro-porous vents reduces cryogen flow through the freeze thaw housing 602.

The temperature drop resulting from cryogen expansion and subsequent sublimation is rapidly communicated to the freeze thaw valve area 605 of fluidic capillaries 604 carrying flowing liquids to be valved. The temperature drop results in the "closing" of the freeze thaw valve or stopping of the flow of liquid through the fluidic capillaries 604. To "open" the freeze thaw valve the freeze thaw area 605 of the freeze thaw housing 602 is warmed. The warming of the freeze thaw housing 602 results in the thawing of liquid within the freeze thaw area 605 causing the fluid flow to resume.

Rapid warming of the freeze thaw housing 602 is achieved using a heating element 606 bonded to the underside of the freeze thaw housing 602 in close proximity to the fluidic capillaries 604. In this illustrative embodiment the heating element 606 is a Kapton® resistance heater. It is contemplated within the scope of the invention that other resistant heating elements that are known in the art may be used. It is further contemplated within the scope of the invention that the heating element 606 can be the hot surface of a Peltier heat pump.

A thermocouple (not shown) can be used to monitor the temperature within this illustrative freeze thaw valve and to control the supply of cryogen or the operation of the heating element 606. Additionally, control electronics can be used to monitor and adjust the inventive freeze thaw valve based upon signals from the thermocouple.

Figure 6A:
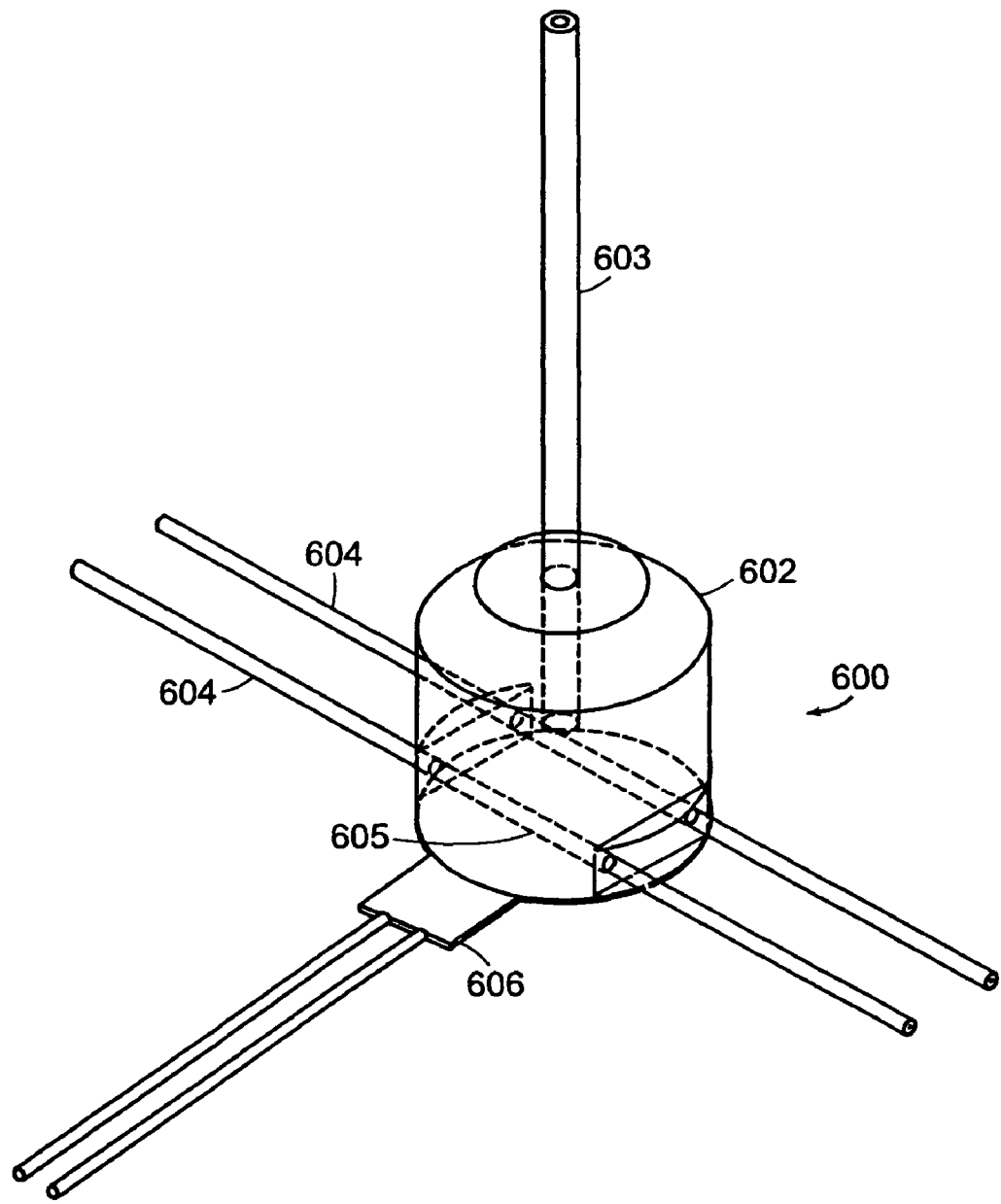
FIG. 6A is a schematic of a further alternative self limiting cryogenic freeze thaw valve.
Figure 6B:
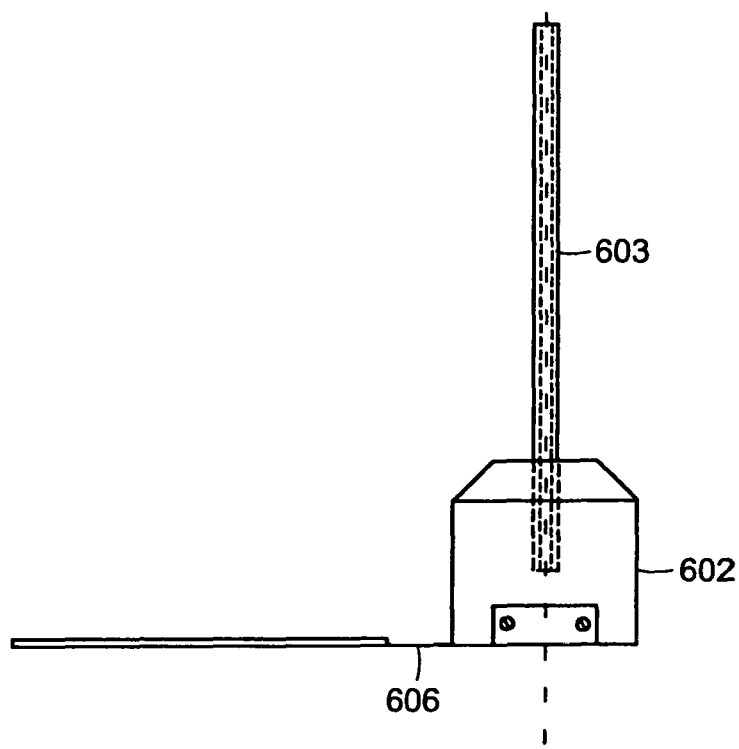
FIG. 6B is a side view of the valve of FIG. 6A.
Figure 6C:
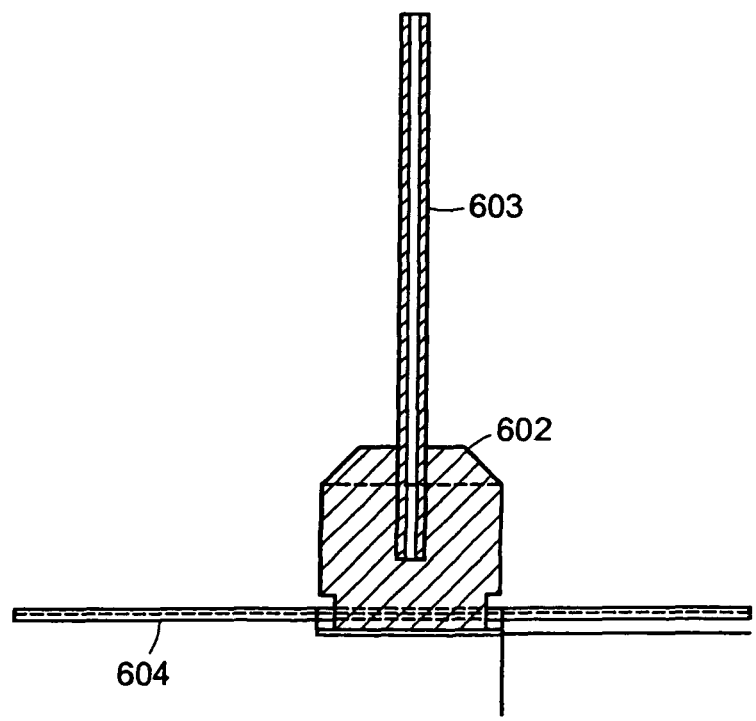
FIG. 6C is a cut away view of the valve of FIG. 6A.
Figure 6D:
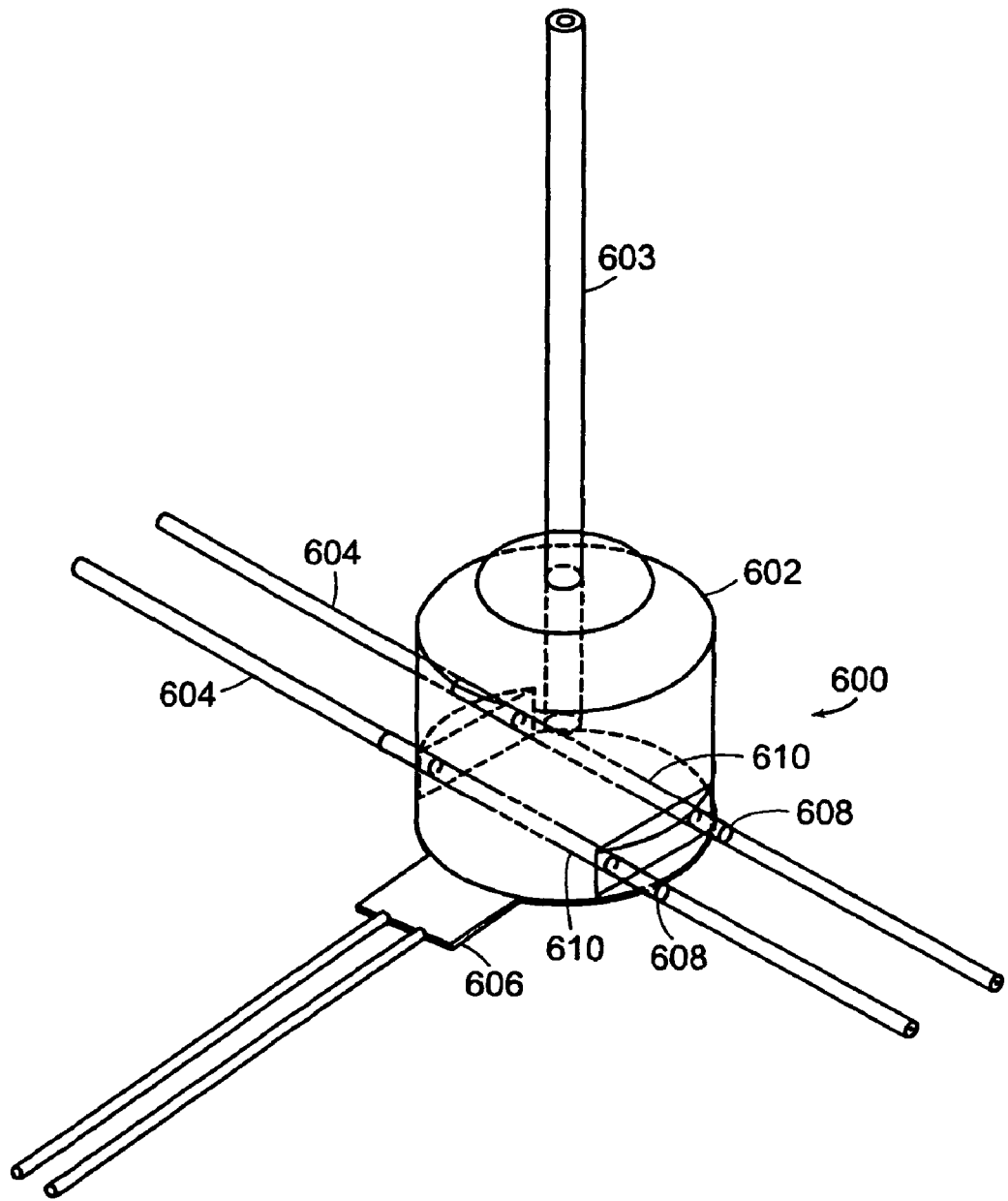
FIG. 6D is a schematic of a further alternative self limiting cryogenic freeze thaw valve.

Turning to FIG. 6D in a further alternative illustrative embodiment, the freeze thaw housing 602 is fitted with non porous protective sheaths 608. The non porous protective sheaths 608 are fabricated from non porous materials having a high thermal conductivity. These protective sheaths 608 allow the freeze thaw housing 602 to be reliably sealed except for the micro-porous vents within the material composition of the freeze thaw housing 602. The protective sheaths 608 form capillary pathways 610. These capillary pathways 610 allow the operator of the inventive freeze thaw valve to easily insert fluidic capillaries 604 carrying flowing liquid to be valved. The protective sheaths 608 also prevent the occlusion of the capillary pathways 610 by the venting of cryogenic material.

Figure 7A:
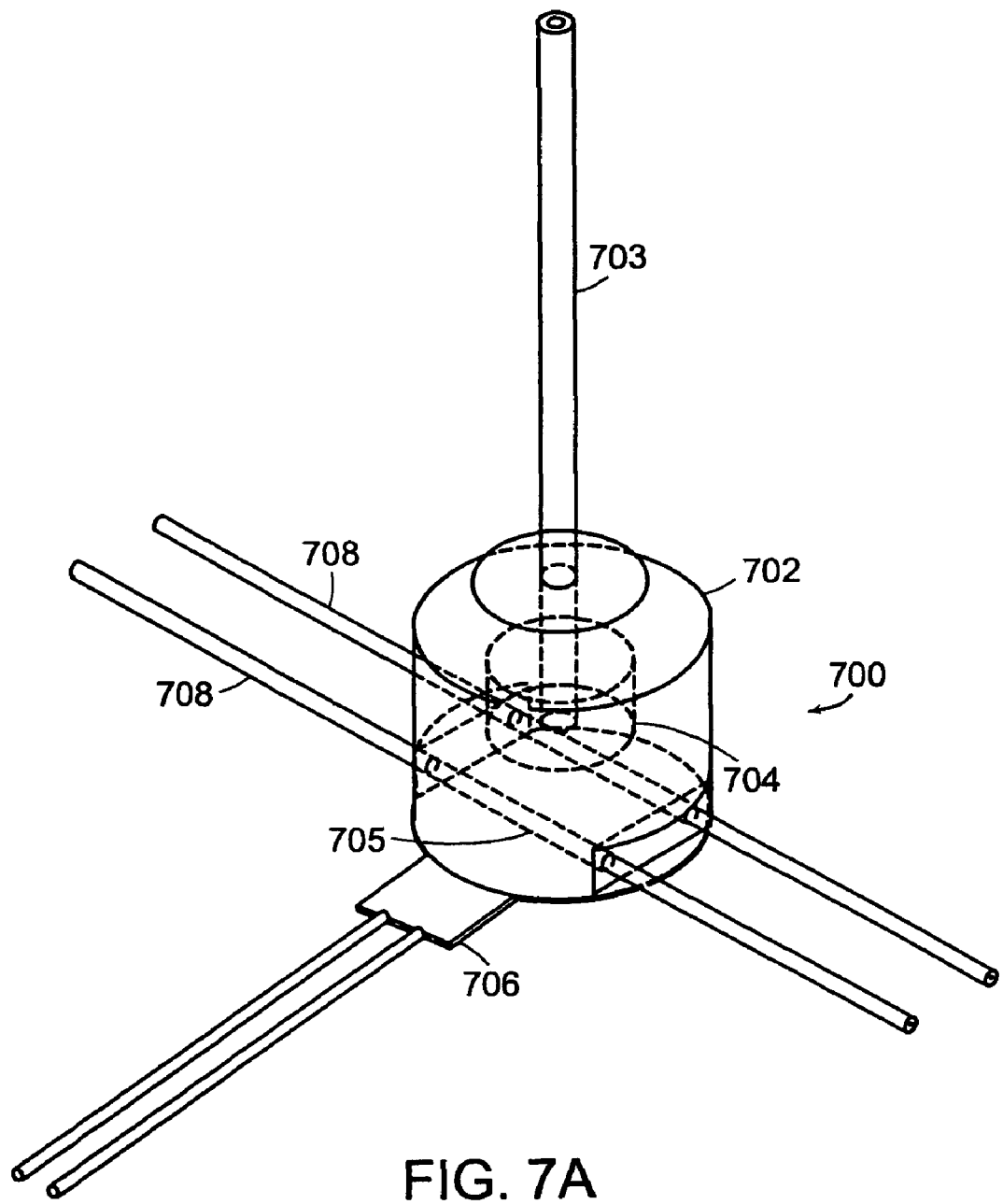
FIG. 7A is a schematic of a further alternative self limiting cryogenic freeze thaw valve.
Figure 7B:
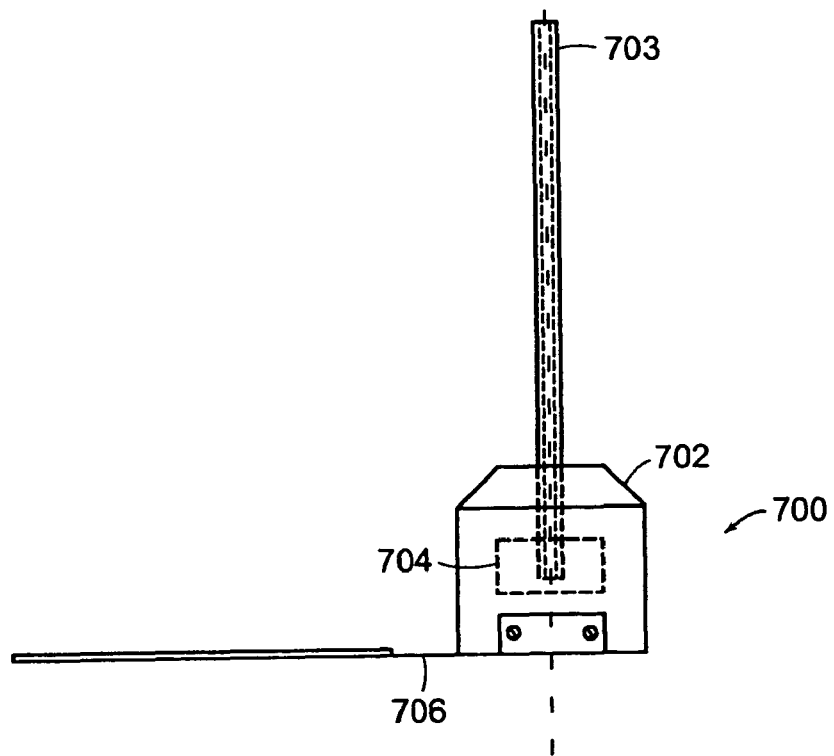
FIG. 7B is a side view of the valve of FIG. 7A.
Figure 7C:
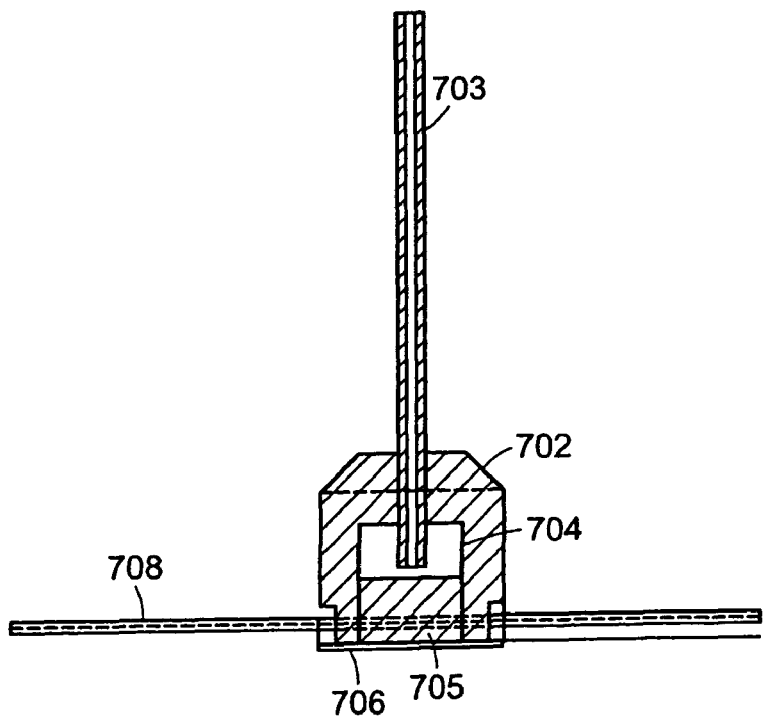
FIG. 7C is a cut away portion showing the thaw valve of FIG. 7A.

Turning to FIGS. 7A, 7B and 7C, yet a further additional alternative embodiment freeze thaw valve 700 having a micro-porous freeze thaw housing 702 with an internal expansion chamber 704 to limit use of a cryogenic agent, is shown. The internal expansion chamber 704 allows a bolus of solid cryogen to form within thereby lowering the temperature of the freeze thaw housing 702. The inventive freeze thaw housing 702 having the expansion chamber 704 is fabricated from micro-porous material. This micro-porous material, in this illustrative embodiment, is a porous aluminum composite. The aluminum composite is manufactured by algroup alusuisse, Alusuisse, Netherland under the trade name METAPOR ®. It is contemplated within the scope of this invention that other porous materials known in the art may be used, such as micro-porous ceramic or the like . This aluminum composite material provides micro vents that are gas permeable allowing for evacuation of the cryogen from the internal expansion chamber 704. In this further alternative illustrative embodiment, a liquid cryogen is introduced into the internal expansion chamber 704 via a cryogen inlet tube 703. The expansion of the liquid cryogen rapidly cools the internal expansion chamber 704 resulting in the formation of a bolus of solid cryogen that occludes the further passage of cryogen into the internal expansion chamber 704. The occlusion of the internal expansion chamber 704 is subsequent to the occlusion of the micro-porous vents within the freeze thaw housing 702. The occlusion of the micro-porous vents reduces cryogen flow through the freeze thawing housing 702 forming a bolus of solid cryogen within the internal expansion chamber 704.

The temperature drop resulting from cryogen expansion, subsequent sublimation and formation of the bolus of solid cryogen is rapidly communicated to the freeze thaw valve area 705 of fluidic capillaries 708 carrying flowing liquids to be valved. The temperature drop results in the "closing" of the freeze thaw valve or stopping of the flow of liquid through the fluidic capillaries 708. To "open" the freeze thaw valve the freeze thaw housing 702 is warmed. The warming of the freeze thaw housing 702 results in the thawing of liquid within the freeze thaw area causing the fluid flow to resume within the fluidic capillaries 708.

Rapid warming of the freeze thaw housing 702, within this illustrative embodiment, is achieved using a heating element 706 bonded to the underside of the freeze thaw housing 702. The heating element 706 is located in close proximity to the fluidic capillaries 708. In this illustrative embodiment the heating element 706 is a Kapton® resistance heater. It is contemplated within the scope of the invention that other resistant heating elements that are known in the art may be used. It is further contemplated within the scope of the invention that the heating element 706 can be the hot surface of a Peltier heat pump.

A thermocouple (not shown) can be used to monitor the temperature within this illustrative freeze thaw valve and to control the supply of cryogen or the operation of the heating element 706. Additionally, control electronics can be used to monitor and adjust the inventive freeze thaw valve based upon signals from the thermocouple.

Figure 7D:
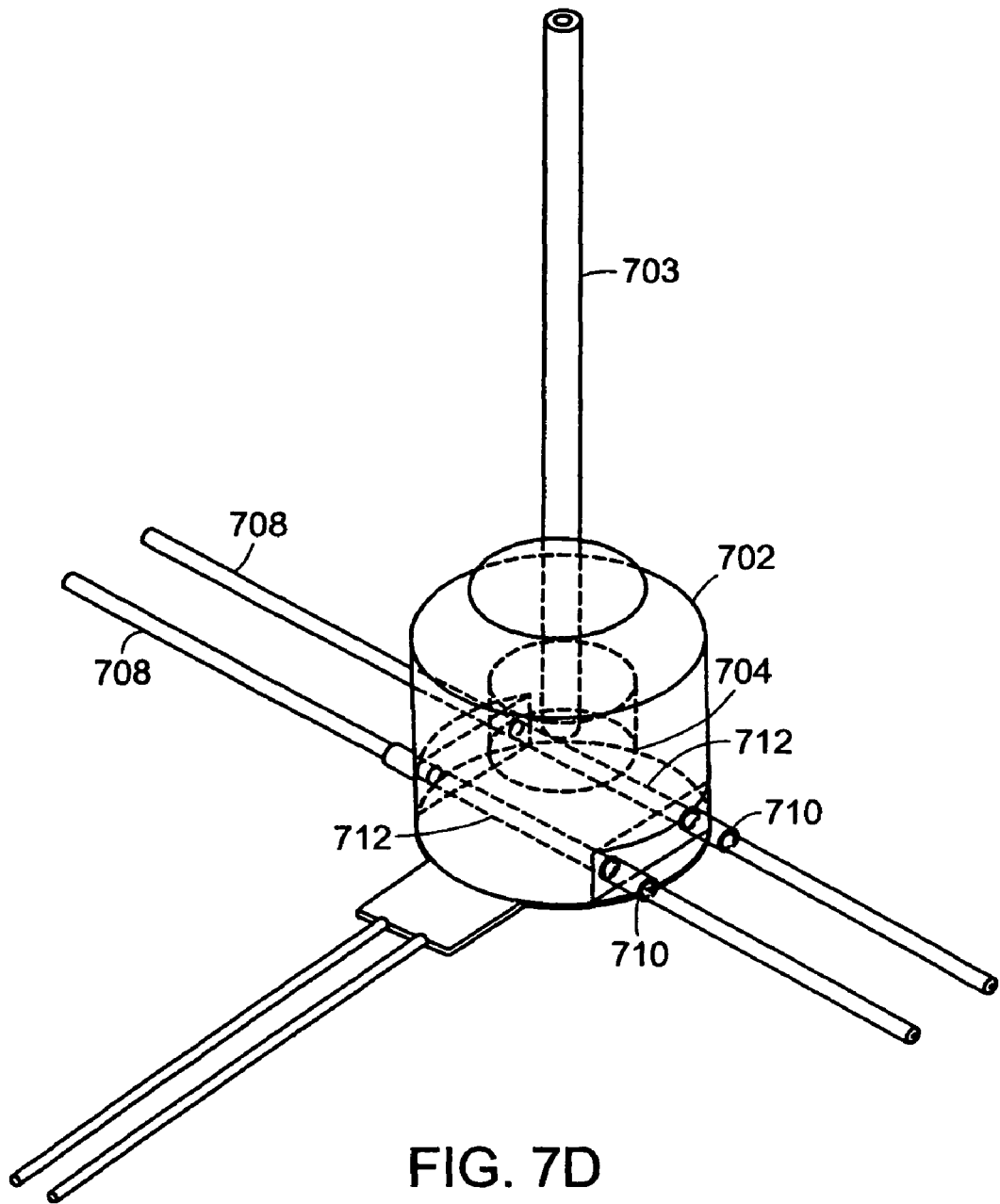
FIG. 7D is a schematic of a further alternative self limiting cryogenic freeze thaw valve fabricated.

Turning to FIG. 7D, in a further alternative illustrative embodiment, the freeze thaw housing 702 is fitted with non porous protective sheaths 710. The non porous protective sheaths 710 are fabricated from non porous materials having a high thermal conductivity. These protective sheaths 710 allow the freeze thaw housing 702 to be reliably sealed except for the micro-porous vents with the material composition of the freeze thaw housing 702. The protective sheaths 710 form capillary pathways 712. These capillary pathways 712 allow the operator of the inventive freeze thaw valve to easily insert fluidic capillaries 708 carrying flowing liquid to be valved. The protective sheaths 710 also prevent the occlusion of the capillary pathways 712 by the venting of cryogenic material.

The expansion chamber and other components of the freeze thaw valve according to the invention can be manufactured by methods known to those skilled in the art. Capillary or channel composition will be a function of structural requirements, manufacturing processes, and reagent compatibility/chemical resistance properties. The choice of materials will depend on a number of factors such as ease in manufacturing and inertness to fluids that will flow through the nano-channels or capillary tubing. Specifically, fluid conduits are provided that are made from inorganic crystalline or amorphous materials, e.g. silicon, silica, quartz, inert metals, or from organic materials such as plastics, for example, poly (methyl methacrylate) (PMMA), acetonitrile-butadiene-styrene (ABS), polycarbonate, polyethylene, polystyrene, polyolefins, polypropylene and metallocene. Fluid conduits of the invention can be fabricated from thermoplastics such as Teflon, polyethylene, polypropylene, methylmethacrylates and polycarbonates, among others, due to their ease of molding, stamping and milling. Alternatively, capillary tubing and channels can be made of silica, glass, quartz or inert metal.

Although in the embodiment described in FIGS. 3A and 3B the capillary tubing 303 is inserted through the expansion chamber. A similar embodiment could be envisioned where the expansion chamber is constructed from a good thermal conductor such as copper with a similar interior geometry as that shown in FIGS. 3A and 3B, but with an exterior geometry which would allow thermal orifices similar to those described in the embodiment shown in FIGS. 2A and 2B to be made in the copper expansion chamber block to accept capillary tubing. In such an embodiment, the capillary tubes would not be exposed to the cryogen, but would still freeze (valve closed) when cryogen were passed through and cooled the expansion zone block and thaw (valve opened) when heating elements would heat the expansion zone block.

Although in the embodiment described in FIGS. 3A and 3B. the constriction at the end of the expansion zone was used to effect blockage of the expansion zone as solid cryogen was formed, other features could be used in or after the expansion zone such as a bend in the expansion zone or exit tubing which would provide a similar convoluted path and effect a similar solid cryogen blockage.

Although the inventive freeze thaw valve having an expansion chamber is discussed in terms of nano scale applications, it should be appreciated that the configurations disclosed herein could be adapted to much larger scale channels or tubes where liquids under high pressure are used. Although specific geometries of the expansion chamber have been set forth in the above illustrative embodiments, it should be appreciated that the configurations disclosed herein are not an exhaustive illustration of geometries or configurations that can be used. It will be further appreciated that any configuration that imparts restrictive properties to the flow of a cryogen into an expansion chamber surrounding a freeze thaw segment can be utilized.

Various other changes, omissions and additions in the form and detail of the present invention may be made therein without departing from the spirit and scope of the invention. Therefore, the above description should not be construed as limiting, but merely as exemplification of the various embodiments.

What is claimed is:

1. A method for limiting a cryogenic agent utilized in a freeze-thaw valve comprising the steps of:
  configuring the freeze-thaw valve to have an expansion chamber, for receiving the cryogenic agent, and at least one thermal orifice for receiving a freeze-thaw segment of a fluidic conduit having flowing contents;
  positioning the fluidic conduit to pass through the at least one thermal orifice so that most of the conduit resides outside of the freeze-thaw valve, and the flowing contents pass along the fluidic conduit and through the freeze-thaw valve without any of the flowing contents directly contacting the cryogenic agent;
  supplying a flow of said cryogenic agent to said expansion chamber to lower a temperature of said expansion chamber and to freeze said flowing contents in the freeze-thaw segment;
  causing the cryogenic agent to form a plug of solid cryogenic agent at an exit of the expansion chamber, such that the only cryogenic agent that exits the expansion chamber is due to sublimation, wherein causing the cryogenic agent to form the plug comprises disposing a sintered stainless steel frit at the exit of the expansion chamber;

maintaining said lowered temperature of said expansion chamber by consuming heat by the sublimation of the solid cryogenic agent at the exit of the expansion chamber;

consuming liquid cryogenic agent due to a re-sealing event in response to pin-holes or fissures appearing in the plug; and heating said expansion chamber thereby thawing said frozen contents and causing the passage of said contents.

2. The method of claim 1 wherein said at least one thermal orifice disposes said freeze-thaw segment within said expansion chamber.

3. The method of claim 1 wherein said cryogenic agent is carbon dioxide.

4. The method of claim 1 wherein said cryogenic agent is nitrogen.

* * * * *